May 10, 1955 G. G. ALEXANDER 2,708,055
ICE CREAM PACKING EQUIPMENT
Filed March 30, 1951
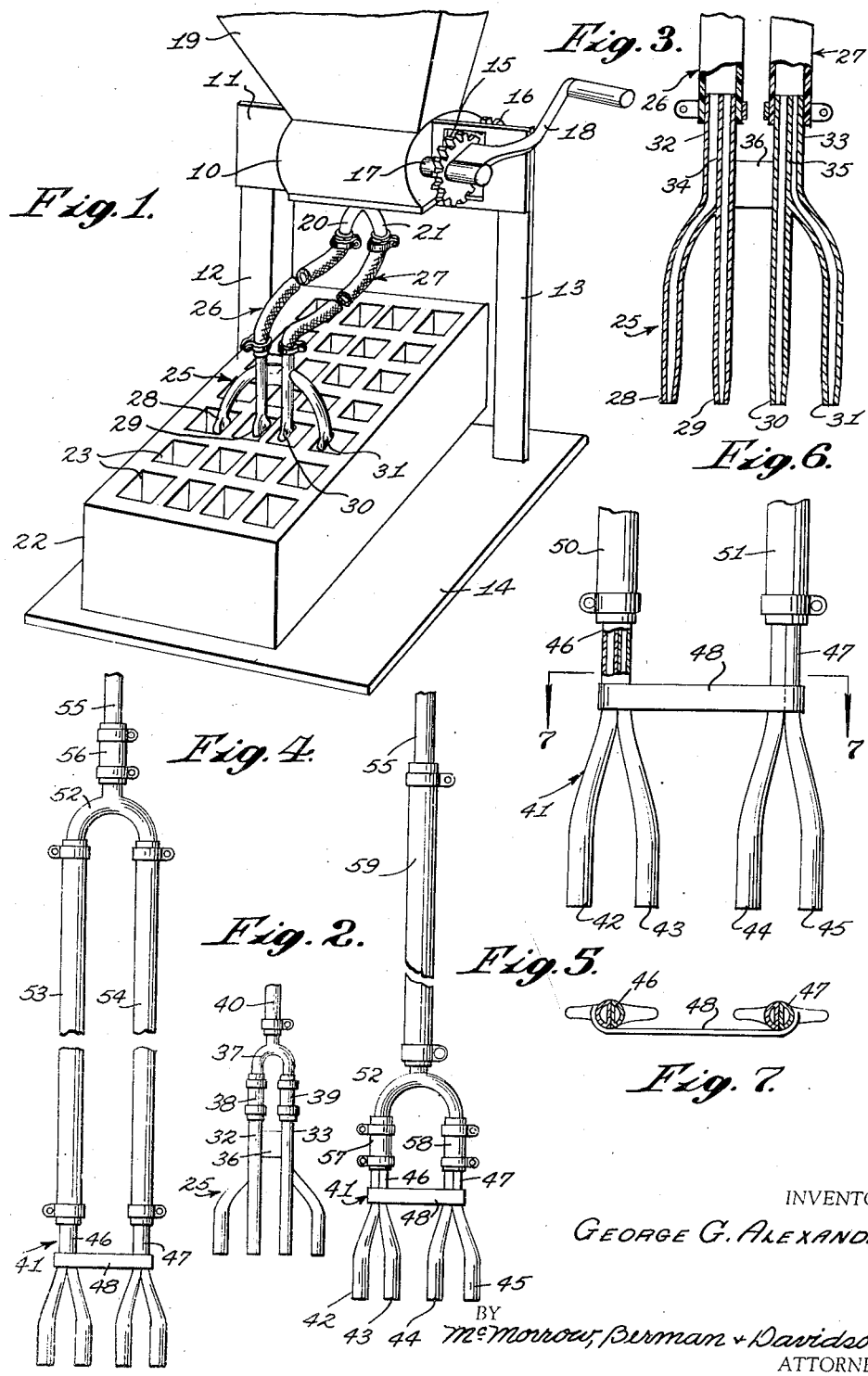
INVENTOR
GEORGE G. ALEXANDER
BY McMorrow, Berman & Davidson
ATTORNEYS United States Patent Office 2,708,055
Patented May 10, 1955

2,708,055

ICE CREAM PACKING EQUIPMENT

George G. Alexander, Savannah, Tenn.

Application March 30, 1951, Serial No. 218,407

4 Claims. (Cl. 222—478)

This invention relates to ice cream packing equipment, and more particularly to a flexible nozzle assembly for distributing ice cream in a partly fluid condition from a supply pump to suitable containers in which the ice cream is packed for sale.

It is among the objects of the invention to provide an improved ice cream dispensing or distributing apparatus including a manually movable, multiple nozzle distributor for placing the ice cream in suitable containers for sale and a flexible conduit connecting the distributor to a relatively fixed supply pump, so that the distributor can be manually moved to properly fill grouped containers regardless of whether the containers are contiguous to or spaced from the supply pump; which includes interchangeable distributors for placing the ice cream in different sizes of containers or in packages, such as "ice cream sandwiches"; which is easily controlled to place the proper amount of ice cream in each container or package and does not force any important part of the entrained air out of the ice cream while the ice cream is being distributed into the containers or packages; which can be applied to various forms of ice cream pumps with no material modification of the pump construction, and which will adapt a single pump for various operations by the provision of interchangeable distributors which are effective to dispense the ice cream at proper pressures for corresponding operations; and which is simple and durable in construction, economical to manufacture, easy to install and positive and effective in operation.

Other objects and advantages will become apparent from a consideration of the following description and appended claims in conjunction with the accompanying drawing, wherein:

Figure 1 is a perspective view of ice cream packing apparatus illustrative of the invention;

Figure 2 is an elevational view of the flexible distributor assembly shown as a component of the apparatus illustrated in Figure 1;

Figure 3 is a medial, longitudinal cross-sectional view on an enlarged scale of the distributor assembly illustrated in Figure 2;

Figure 4 is an elevational view of a somewhat modified form of flexible distributor assembly;

Figure 5 is an elevational view of a still further modified form of flexible distributor assembly;

Figure 6 is an elevational view on a somewhat enlarged scale of a fragmentary portion of the distributor assembly illustrated in Figure 4, a portion being broken away and shown in cross-section to better illustrate the construction thereof; and Figure 7 is a transverse cross-sectional view on the line 7—7 of Figure 6.

With continued reference to the drawing, the packing apparatus illustrated in Figure 1 comprises a gear pump 10 mounted on the top crosspiece 11 of a frame which includes, in addition to the crosspiece 11, a pair of spaced apart and substantially parallel posts 12 and 13 secured at their lower ends to a flat base 14 of rectangular shape near one end of the base and extending upwardly from the base substantially perpendicular thereto. The top crosspiece 11 is secured at its opposite ends to the posts 12 and 13 at the upper ends of the posts remote from the base 14, and is provided with openings to receive the pump 10 and the external pump gears 15 and 16 which are mounted on pump shafts, as indicated at 17, which are journaled in the pump housing and carry the internal pump gears. Operating means, such as the hand crank 18, is connected at one end to one of the external pump gears for operating the pump.

A hopper 19 is shown mounted on the upper side of the pump 10 for holding a supply of ice cream at the inlet side of the pump. This hopper communicates interiorly with the interior of the pump for supplying the ice cream to the pump, and a pair of outlet spouts 20 and 21 extend from the lower or outlet side of the pump for delivering the ice cream from the pump when the pump is in operation. A form or mold box 22 is placed on the base 14 and is provided with compartments 23 opening to the upper side of the box for receiving containers, such as paper cartons of one quart or one pint capacity, or the wrappings and outer layers of packages, such as ice cream sandwiches.

The rows of compartments 23 in the form box is limited to the number of outlet spouts of the pump which is not ordinarily more than two, and as the cartons or packages in each form box are filled, the form box must be removed from the apparatus and a new box entered beneath the outlet spouts of the pump. This is a laborious and time-consuming operation, and requires that, while the apparatus is being used for filling the cartons, the ice cream be manually packed in the cartons with a hand paddle as it is fed into the cartons from the outlet spouts, and that it be manually leveled off so that the cartons can be closed. As different pressures are required for different operations, such as filling cartons and making ice cream sandwiches, it is also necessary to furnish different sets of internal gears for the pump 10, so that the ice cream will be delivered from the outlet spouts at the desired pressure.

In accordance with the present invention, a multinozzle distributor, generally indicated at 25 and provided in somewhat different forms for different operations, is connected to the outlet spouts of the pump by one or more flexible conduits, as generally indicated at 26 and 27 in Figure 1, so that the distributor can be manually moved relative to the pump and can be used at locations spaced from the pump, if desired.

The distributor 25, as shown in cross-section in Figure 3, has four nozzles 28, 29, 30 and 31, having their center lines disposed substantially in a common plane and spaced apart at substantially equal distances from each other, and has two spaced apart inlet fittings 32 and 33, each divided interiorly into two substantially equal spaces by longitudinally extending partitions, as indicated at 34 and 35, respectively. The two inlet fittings are held in spaced apart position relative to each other by a bridge 36 extending between the two fittings and connected to the fittings at its respectively opposite ends. The nozzles 28 and 29 are individually connected by separate conduits to the corresponding spaces in the inlet fitting 32, and the two nozzles 30 and 31 are similarly connected individually to the two spaces within the inlet fitting 33 by separate conduits.

Where the pump has two outlet spouts, as illustrated in Figure 1, each inlet fitting of the distributor is connected by an individual flexible conduit, such as a length of rubber hose, to a corresponding pump outlet spout, as indicated at 26 and 27 in Figure 1.

The distributor 25 is especially designed for a particular operation, such as filling cartons of a particular size or making up packages, and is designed to dispense the ice cream at the proper pressure for the particular operation with a predetermined set of pump gears.

In the arrangement illustrated in Figure 2, the distributor 25 is arranged for connection to a pump having a single outlet spout and in this case a Y-fitting 37 has two of its ends connected to the inlet fittings 32 and 33 of the distributor, respectively, by connectors 38 and 39 of flexible material, and the Y-fitting has its third end connected by a flexible conduit 40 of suitable length to the single outlet spout of the ice cream delivery pump.

The modified form of distributor illustrated in Figures 4, 5, 6 and 7 and generally indicated at 41 is the same in principle as the distributor 25, but is of somewhat different construction, as it is designed for a different operation. If it be considered that the distributor 25 is particularly designed for filling packages, such as ice cream sandwiches, and that the distributor 41 is designed for filling one-quart cartons with ice cream, the distributor 41 will be larger than the distributor 25 and will have its nozzles spaced apart a greater distance than the nozzles of the distributor 25.

The distributor 41 has four nozzles 42, 43, 44 and 45, having their longitudinal center lines substantially in a common plane and spaced apart at substantially equal distances. This distributor may conveniently be formed of four metal tubes of the proper diameter and of substantially the same length, in which one end of each tube constitutes a corresponding nozzle of the distributor. At a location spaced from the nozzle ends the tubes are bent so that the two tubes at each side of the distributor converge together at a location intermediate their length. From this location to their ends remote from their nozzle ends, the two tubes of each pair of converging tubes have their contiguous sides flattened and secured together to provide for the distributor spaced apart inlet fittings 46 and 47, each of which is connected to two nozzles, and each of which is divided into two channels, one for each of the nozzles to which it is connected.

A bridge 48 extends between the two inlet fittings 46 and 47 and is secured at its opposite ends to the fittings to hold the two side portions of the distributor in spaced apart relationship to each other. This bridge may comprise a metal strap of suitable dimensions secured at its ends to the tubes constituting the opposite sides of the distributor by suitable means, such as brazing or soldering.

Where the distributor 41 is connected to a pump having two outlet spouts, as illustrated in Figure 1, two flexible conduits 50 and 51 are provided, each connected at one end to a corresponding inlet fitting of the distributor and connected at its other end to a corresponding outlet spout of the pump.

Figures 4 and 6 illustrate two different ways of connecting a distributor, such as the distributor 41 to a single pump outlet spout. In the arrangement illustrated in Figure 4, the inlet fittings 46 and 47 of the distributor are connected to two ends of a Y-fitting 52 by long flexible conduits 53 and 54, and the third end of the Y-fitting is connected to the pump outlet spout 55 by a short coupling 56 of flexible material, the Y-fitting in this case being disposed adjacent the outlet spout of the pump. In the arrangement illustrated in Figure 5, the Y-fitting 52 is disposed adjacent the distributor 41 and has two of its ends connected to the distributor inlet fittings 46 and 47 by short couplings 57 and 58 of flexible material and has its third end connected to the pump outlet spout 55 by a single long flexible conduit 59.

The distributor 41 is so designed that using the same pump gears as used for the distributor 25 it will dispense the ice cream at the proper pressure for its particular operation. This pressure is controlled, at least in part, by the cross-sectional area of the channels leading to the several nozzles of the distributor, and by the shape and cross-sectional area of the nozzle itself, the nozzles of the distributor 25, as illustrated in Figure 1, being shown as being flattened to modify their shape and cross-sectional area.

While only two different distributors have been illustrated and hereinabove described, it is to be understood that other interchangeable distributors for different operations may be provided, and especially designed for a particular packing operation.

While the device illustrated in Figure 1 is shown as arranged for filling cartons or packages held in a form box disposed on the base 14 of the apparatus, by providing the flexible conduits of the proper length, the form box may obviously be disposed at some other location more or less remote from the supply pump 10, and the device may be used, if desired, for filling form boxes moving along a conveyor belt.

The distributors may be formed of suitable material, such as metal or a non-metallic material of sufficient structural strength and capable of resisting sterilizing temperatures, and the flexible conduits may be formed of suitable flexible material, such as rubber or a synthetic resin plastic.

The invention may be embodied in other specific forms without departing from the spirit or essential characteristics thereof. The present embodiments are, therefore, to be considered in all respects as illustrative and not restrictive, the scope of the invention being indicated by the appended claims rather than by the foregoing description, and all changes which come within the meaning and range of equivalency of the claims are, therefore, intended to be embraced therein.

What is claimed is:

1. Apparatus for dispensing flowable material from a supply pump comprising a distributor adapted to be held by an operator, and flexible conduit means connected to said distributor for connecting the latter to a supply pump, said distributor comprising a tubular structure providing at one end spaced apart nozzles having their longitudinal center lines substantially in a common plane, and at its other end at least two inlet fittings spaced one from the other and each connected to a corresponding group of nozzles, said distributor providing individual channels extending one from each nozzle through the corresponding inlet fitting, and said flexible conduit means comprising lengths of flexible tubing each connected at one end to a corresponding inlet fitting of said distributor.

2. Apparatus for dispensing flowable material from a supply pump comprising a distributor adapted to be held by an operator, and flexible conduit means connected to said distributor for connecting the latter to a supply pump, said distributor comprising a tubular structure providing at one end nozzles uniformly spaced apart and having their longitudinal center lines substantially in a common plane, and at its other end at least two inlet fittings spaced one from the other and each connected to a corresponding group of nozzles, said distributor providing individual channels extending one from each nozzle through the corresponding inlet fitting, and said flexible conduit means comprising a Y-fitting having two of its ends connected to corresponding inlet fittings of said distributor, and a length of flexible tubing connected at one end to the third end of said Y-fitting.

3. Apparatus for dispensing flowable material from a supply pump comprising a distributor adapted to be held by an operator, and flexible conduit means connected to said distributor for connecting the latter to a supply pump, said distributor comprising a tubular structure providing at one end nozzles uniformly spaced apart and having their longitudinal center lines substantially in a common plane, and at its other end at least two inlet fittings spaced one from the other and each connected to a corresponding group of nozzles, said distributor providing individual channels extending one from each nozzle through the corresponding inlet fitting, and said flexible conduit means comprising a Y-fitting, lengths of flexible tubing connected each at one end to a corresponding one of two ends of said Y-fitting and at its other end to a corresponding inlet fitting of said distributor, and a coupling connected to the other end of said Y-fitting for connecting the latter to a pump outlet spout.

4. Apparatus for dispensing flowable material from a supply pump comprising a distributor freely movable relative to the associated pump and adapted to be held by an operator, said distributor comprising a tubular structure providing at one end nozzles uniformly spaced apart with their longitudinal center lines substantially in a common plane and providing at its other end at least two inlet fittings spaced from each other and each connected to a corresponding group of nozzles, and flexible conduits connected one to each of said inlet fittings and adapted to be connected to the associated supply pump, said distributor providing individual channels extending one from each nozzle through the corresponding inlet fitting.

References Cited in the file of this patent

UNITED STATES PATENTS

| Number | Name | Date |
|---|---|---|
| 250,500 | Chewning | Dec. 6, 1881 |
| 667,947 | Morrison | Feb. 12, 1901 |
| 1,048,597 | Shephard | Dec. 31, 1912 |
| 1,073,963 | Cottle | Sept. 23, 1913 |
| 1,374,767 | Ragsdale | Apr. 12, 1921 |
| 1,458,070 | Long et al. | June 5, 1923 |
| 1,728,113 | Fertally, Sr. | Sept. 10, 1929 |
| 2,189,018 | Robinson | Feb. 6, 1940 |
| 2,451,011 | Yoars | Oct. 12, 1948 |